May 7, 1963 C. A. HANINGTON 3,088,353
MECHANISM FOR AND METHOD OF PRODUCING SURGICAL PADS
Filed March 23, 1959 4 Sheets-Sheet 1
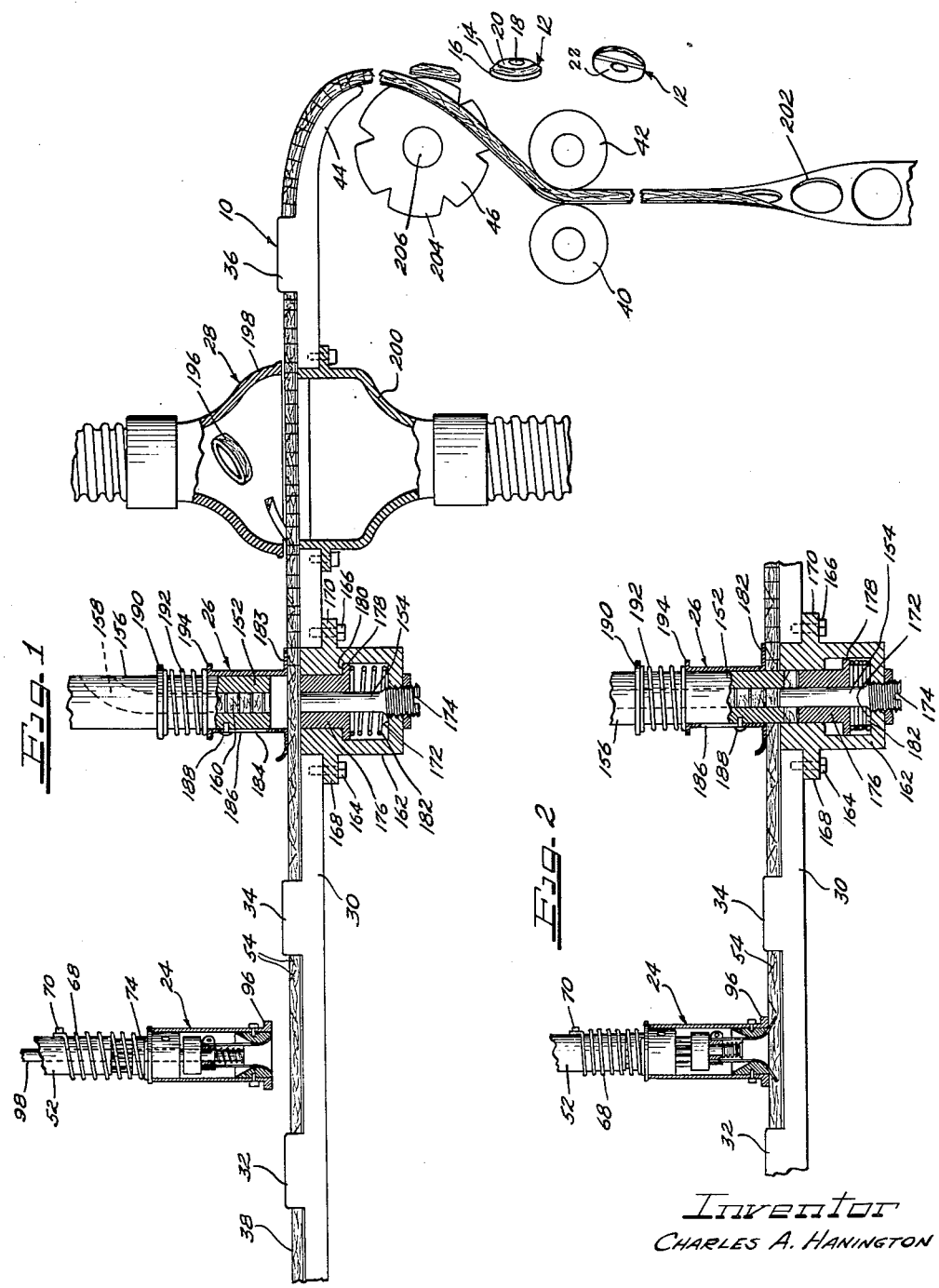
Inventor
CHARLES A. HANINGTON
by Hill, Sherman, Meroni, Gross & Simpson Attys.

May 7, 1963   C. A. HANINGTON   3,088,353
MECHANISM FOR AND METHOD OF PRODUCING SURGICAL PADS
Filed March 23, 1959   4 Sheets-Sheet 2

Inventor
CHARLES A. HANINGTON

May 7, 1963　　　　C. A. HANINGTON　　　　3,088,353
MECHANISM FOR AND METHOD OF PRODUCING SURGICAL PADS
Filed March 23, 1959　　　　　　　　　　　　4 Sheets-Sheet 3
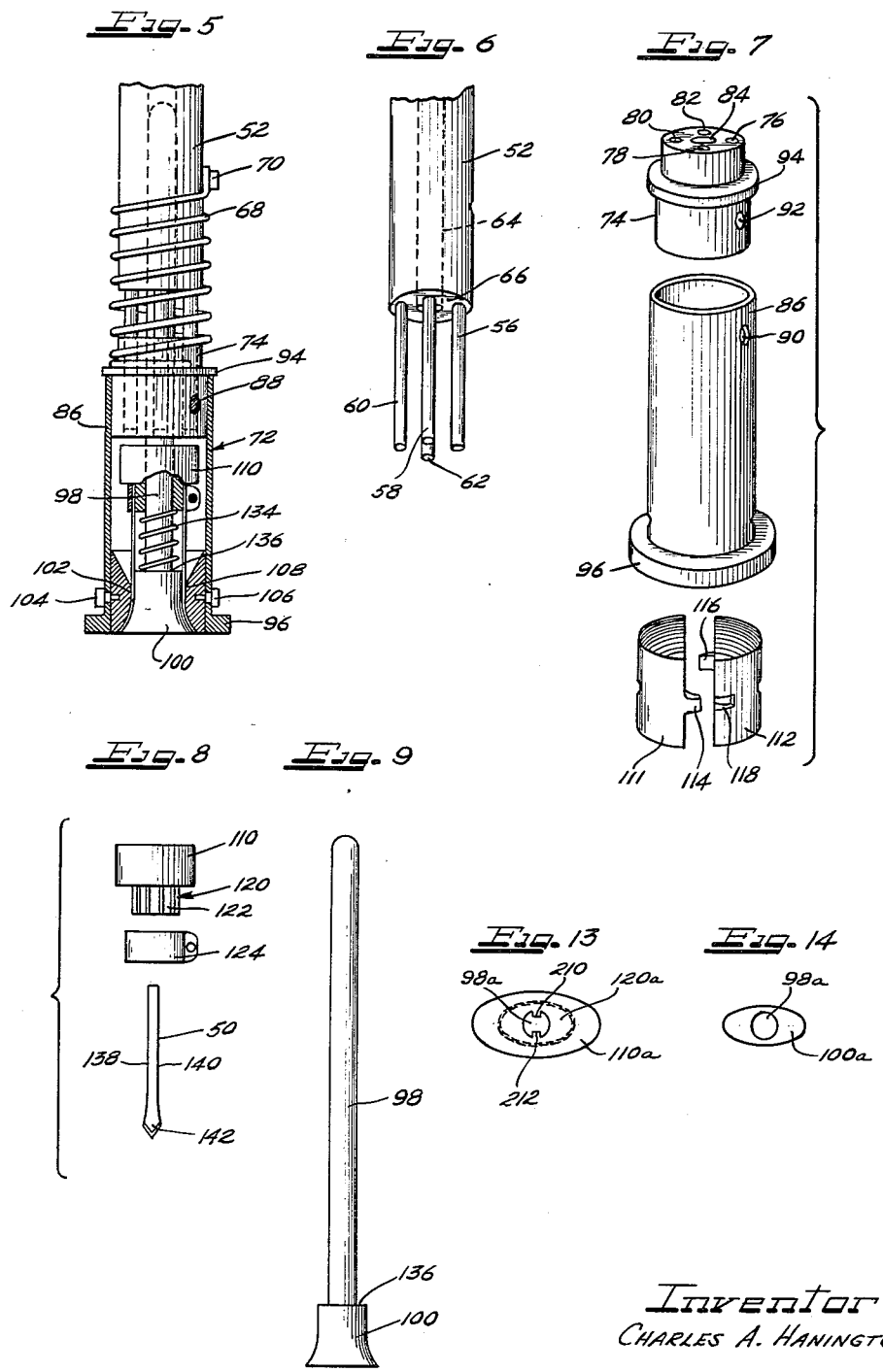
Inventor
CHARLES A. HANINGTON

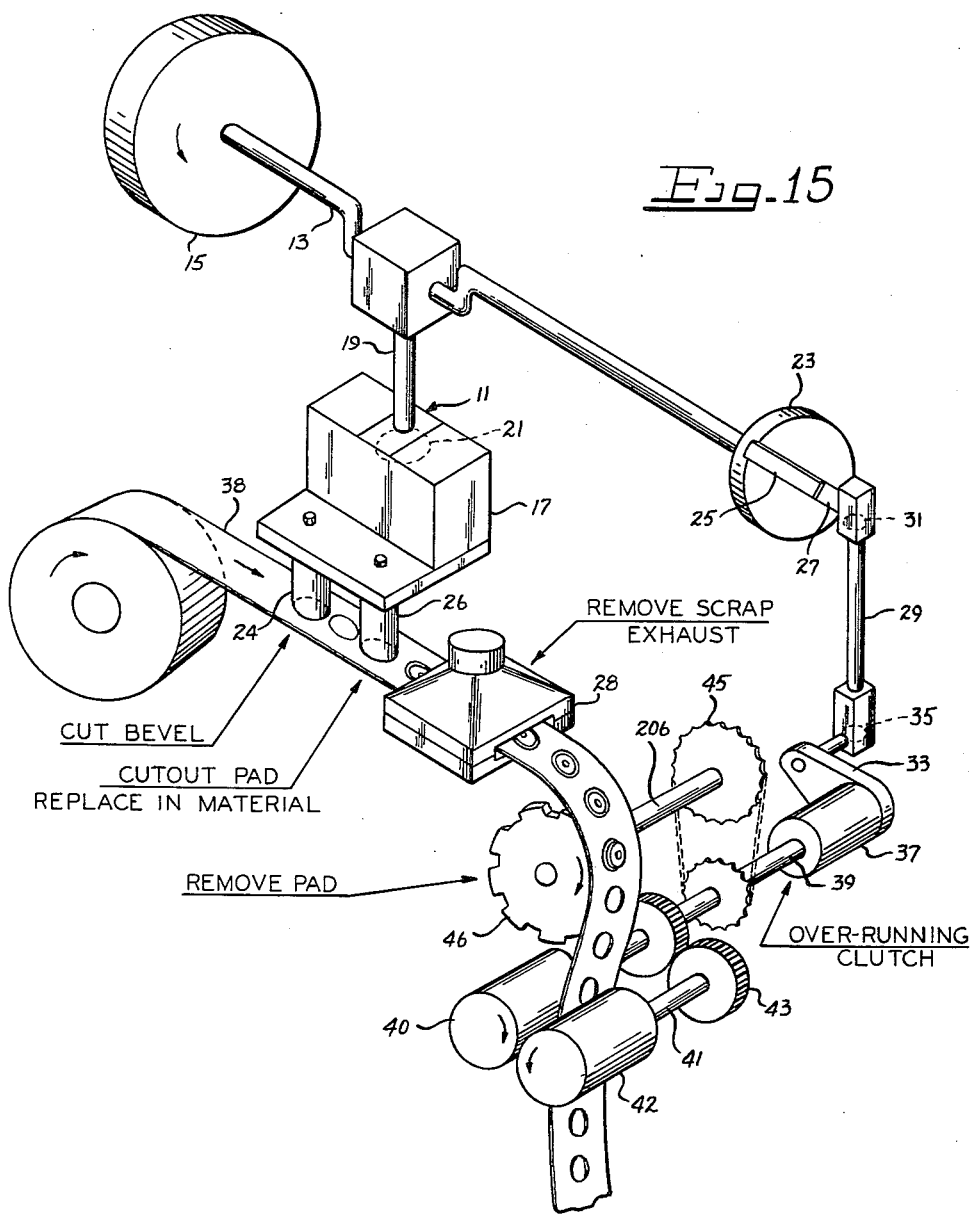

United States Patent Office 3,088,353
Patented May 7, 1963

3,088,353
MECHANISM FOR AND METHOD OF PRODUCING SURGICAL PADS
Charles A. Hanington, Freeport, N.Y., assignor to The Scholl Mfg. Co., Inc., Chicago, Ill., a corporation of New York
Filed Mar. 23, 1959, Ser. No. 801,088
8 Claims. (Cl. 83—24)

This invention relates to an apparatus and method for bevelling felt corn pads and more particularly to a means and method for continuously cutting, punching and ejecting felt corn, callous and similar pads.

In order to provide a desirably contoured felt corn, callous or like pad, the upper peripheral surfaces of the pad should be shaped downwardly and outwardly, somewhat in the configuration of a truncated cone, so that there will be no unnecessary contact surfaces presented by the pad such as would create a sharp angle which might cause the pad to become dislodged or would otherwise be uncomfortable. The invention provides for moving a continuous strip of felt along a support platform having intermittently spaced guides on either side thereof for centering the strip. The strip has a width somewhat greater than the diameter of the pads to be formed therefrom and a depth corresponding to the maximum thickness of the pads. In order to move the belt continuously past the forming means for the pads, counter-rotating rollers receive the belt at the end of its travel over the support; and disposed between the rollers and the conveyor is a rotatable, gear-like member having projecting bosses which are configured and dimensioned to penetrate successively into the strip so as to eject the pads after they have been cut.

In order to form a desired bevel for the upper and outer edges of the pads, a bevel cutter is provided according to the invention which is connected to suitable punch means for moving the bevel cutter downwardly in synchronization with the movement of the strip, so that successive oval or circular bevelled cuts are made in predetermined axially spaced relation along the strip. These bevel cuts extend into the strip for a distance which preferably is somewhat greater than half of the depth of the strip. The bevel cutter comprises an upper plunger carrying a plurality of prongs telescopically received within a guide element secured in a lower housing. The plunger is spring biased upwardly from the housing and is intermittently depressed so that the prongs engage a bearing slidably mounted on a central guide post fixed coaxially within the housing and extending telescopically into the plunger. The bearing carries a plurality of annularly arranged, partially overlapping cutting blades each having sharp and preferably arrow-shaped lower ends. The blades are guided into cutting engagement with the strip by an arcuate guide carried on the lower end of the post and an annular, complementarily shaped guide secured in the lower end of the housing. These lower guides cam the blades outwardly in a continuous, fan-like cutting relationship at a desired angle for forming a bevelled cut. A spring element is carried in surrounding relation to the post to move the bearing and the blades upwardly again after each individual cutting operation.

In order to cut lower vertical edges for the pads, a punch is provided wherein an upper punch of cylindrical configuration successively engages the strip in register with a bevelled cut and shears the strip against a cutter sleeve beneath the strip. The upper punch moves the pad thus formed downwardly against a spring-mounted bearing element in the sleeve and simultaneously cuts a center hole therein by means of an upstanding punch within the sleeve which telescopes into a central bore in the upper punch, whereupon the bearing moves the pad into register with the strip. The center discs which are cut from the pads as they pass beneath the punch are stacked within the central bore of the cylindrical punch and removed vacuumatically or otherwise through a conduit formed continuously with the central bore. Thereupon the pads pass through a vacuum means wherein upper and lower vacuum nozzles enclose a plurality of pads along the strip. The lower vacuum acts with somewhat greater force upon the pads than the upper vacuum so as to hold the pads in position in the strip, while the upper vacuum removes the annular felt waste formed by the intersecting bevelling and punching operations, through a vacuum conduit to a suitable disposal location. Although the lower vacuum thus holds down the cut pads and the strip, it does not retard their forward movement. Thereafter the strip and the pads therein are moved along a preferably arcuately downwardly curved terminal portion of the support platform and into engagement with the gear-like ejector, as drawn by roller means below the ejector, and the bosses of the ejector project successively into the strip to eject the individual pads from the strip.

Accordingly, it is an object of the present invention to provide a mechanism for bevelling felt corn, callous or similar pads automatically and continuously.

Another object of the invention is to provide a mechanism as described in which the pads are cut from a continuous strip of felt or similar material and are punched to define outer boundaries for the pad which intersect the bevelled cuts, as well as a central opening therein, simultaneously.

Another object of the invention is to provide a mechanism and method as described wherein vacuum means remove the annular waste formed by the bevelling and punching operations while maintaining the pads and the strip in position on the support means therefor and permitting uninterrupted progress of the strip.

Other objects and advantages of the invention will become apparent as the description proceeds in accordance with the drawings in which:

FIGURE 1 is a side elevational view, partly in vertical section, of a mechanism for cutting, punching and ejecting felt corn, callous and similar pads;

FIGURE 2 is a partial elevational view corresponding to the view of FIGURE 1 and showing the cutting and punching means in operation;

FIGURE 5 is a side elevational view, partially in vertical section, of the cutter of the invention;

FIGURE 6 is a perspective view of a plunger for the cutter shown in FIGURE 5;

FIGURE 7 is an exploded, perspective view of housing, guide and cam means for the cutter of the invention;

FIGURE 8 is an exploded, elevational view of a cutter blade assembly for the cutter of the invention;

FIGURE 9 is an elevational view of a guide post and cam structure for the cutter of the invention;

FIGURE 13 is a bottom plan view of a blade holder and bearing means for an oval cutter according to the invention;

FIGURE 14 is a bottom plan view of oval cam; and

FIGURE 15 is a diagrammatic view, diagrammatically showing a means for co-ordinating the operations of the work stations with a moving strip of material.

Figure 3:
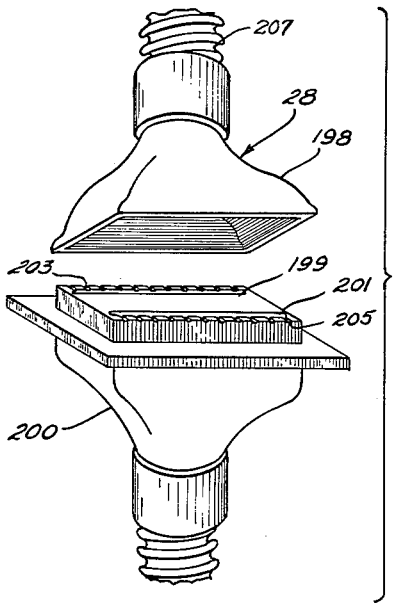
FIGURE 3 is a perspective view of the vacuum means for drawing off waste material from the pads and strip.

Referring now to the drawings, a mechanism 10 is shown for continuously cutting, punching and ejecting a plurality of felt corn, callous or similar pads 12. In order to provide a contoured surface for the pads which will not have projecting sharp corners and which will present an attractive appearance, a bevelled upper peripheral edge surface 14 is formed therein which intersects a lower, vertical outer edge surface 16 forming the outer boundary of the pad. The pads 12 also define a preferably circular hole 18, in accordance with the understanding of those skilled in the art, so as to create a pressure-free area for a corn, callous or like condition, and which is located centrally in relation to a top surface 20 of the pad, and a parallel bottom surface 22 which will be seen to have a greater area than the upper surface 20. In the form shown in FIGURE 1, the pads 12 are circular in outline, but may also be given an oval shape, as hereinafter set forth.

The mechanism 10 comprises a bevel cutter means 24, a punch means 26 and a vacuum means 28, each of the means 24, 26 and 28 being spaced axially a predetermined distance from one another along a support platform 30 to provide synchronized, coacting operating stations. The support platform 30 has upstanding pairs of guide flanges 32, 34 and 36 formed therealong for guiding and retaining a continuous strip 38 of felt or other suitable material from which the pads 12 are cut. In order to move the strip 38 along the conveyor platform 30 at a desired rate, a pair of counter-rotating rollers 40 and 42 are positioned in underlying relationship to an arcuately downwardly extending end 44 of the support platform 30, and the end portion 44 feeds the strip to an ejector 46 rotatably mounted above the rollers 40 and 42 and in substantially tangential relation beneath the end portion 44.

In FIGURE 15 I have diagrammatically shown a punch press 11 operated by a crank 13 driven by a drive member 16, which may be in the form of a pulley driven by a belt (not shown). The crank 13 has connection with a die block 17 guided for vertical movement toward and from the support platform 30. The die block 17 is driven from the crank 13 through a connecting rod 19 journaled on said crank at one end and connected at its opposite end with the die block 17, through a ball and socket joint 21. The die block 17 is shown as having the bevel cutter 24 and the punch means 26 mounted thereon, for simultaneously forming a bevelled cut in the upper portion of the strip of felt 38 and punching in a previously bevelled pad a peripheral vertical edge intersecting the bevelled cut and a central hole within the peripheral edge. I have also shown the vacuum scrap remover 28 in advance of the punch press 11 and have shown a drive connection to the ejector 46 and the feed rollers 40 and 42 for intermittently driving said ejector and feed rollers.

As herein shown an eccentric disk 23 is mounted on the crank shaft 13 and has a slot 45 extending diagrammatically thereacross. The slot 25 has a slide 27 slidably mounted therein and connected with a connecting rod 29 through a ball and socket joint 31. The opposite end of the connecting rod 29 from the ball and socket joint 31 is connected with a crank arm 33 through a ball and socket joint 35. The crank arm 33 drives an overrunning clutch 37 for intermittently driving a shaft 39 in one direction, in an obvious manner. The shaft 39 is shown as having the feed roller 40 mounted thereon. A parallel shaft 41 forms a drive member for the feed roller 42, for driving said feed roller simultaneously with the feed roller 40 through a set of meshing gears 43. A chain and sprocket drive 45 is provided to drive a shaft 206 from the shaft 39. The shaft 206 forms a drive member for the ejector 46.

The crank shaft 13 serves to drive the bevel cutter 24 and punch 26 simultaneously, and to intermittently drive the feed rollers 40 and 42 and the ejector 46, to draw the strip material 38 along the bevel cutter, punch, vacuum scrap remover and ejector, and provide dwells in the travel of the strip material, at which times the strip material is simultaneously bevelled and punched at longitudinally spaced places, it being understood that the completed pads are ejected by the ejector 46 during travel of the strip material and rotation of said ejector.

In order to cut the bevelled surfaces 14 in successive pads 12, the cutter 24 is provided with a cutter blade assembly 48 carrying a plurality of annularly arranged cutter blades 50 as hereinafter described. The cutter 24 includes a plunger 52 carried by a suitable means as shown schematically at 53 for depressing the plunger intermittently and synchronously as understood by those skilled in the art, with the rate at which the strip 38 proceeds along the conveyor 30, in order to form successive cuts 54 in closely spaced relationship to one another along the strip 38, as hereinafter further described. The plunger 52 carries a plurality of axially downwardly extending prongs 56, 58, 60 and 62 which are spaced around a coaxial bore 64 extending upwardly from the bottom 66 of the plunger. A helical spring 68 is secured at its upper end to the plunger by suitable means such as a bolt 70 and at its lower end is secured by suitable means (not shown) to a housing 72, preferably in surrounding relationship to an upstanding cylindrical guide 74 in the housing 72. The guide 74 has formed therein a plurality of bores 76, 78, 80 and 82 telescopically receiving the prongs 56–62 therethrough and also defines a central bore 84 in register with the bore 64 in the plunger 52. The guide may be secured within a sleeve portion 86 of the housing by means of a suitable bolt 88 or the like extending into openings 90 and 92, and may have an annular flange 94 seating on the upper end of the sleeve 86.

The lower end of the sleeve 86 defines a relatively wide annular shoulder 96 so as to firmly engage and hold down the strip 38 during a cutting operation, and a guide post 98 is fixedly secured within the bore 84 of the guide 74, preferably by means of the bolt 88, with its upper end slidably received in the bore 64 of the plunger 52. The lower end of the guide post 98 carries a cam member 100 which terminates in register with the bottom of the flange 96 in order to spread the blades 50 at a suitable angle for bevelling. The cam has an outwardly and downwardly arcuate configuration, and a complementarily configured annular cam 102 is mounted within the lower end of the sleeve 86 in surrounding relation to the cam 100 by suitable means such as the bolts 104 and 106. The cams 100 and 102 define a space 108 therebetween such as to receive therethrough the blades 50 for camming and spreading the blade outwardly into cutting engagement with the strip 38. The cam 102 may be formed in semi-circular sections 111 and 112 as seen in FIGURE 7 disposed in mating engagement by means of opposed teeth 114 and 116 received in suitable slots 118.

As seen particularly in FIGURES 8, 10, 11 and 12, the blades 50 are retained in the assembly 48 in mutually overlapping, back to back and relatively offset or staggered relation to one another by means of a depending cylindrical extension 120 on the bearing 110 having a plurality of angularly spaced grooves 122 which receive the upper ends of the blades 50 to form an inner ring 50a. A clamp 124 is disposed in surrounding relation to the extension 120 and defines therein a plurality of angularly spaced grooves 126 for receiving an outer ring of the blades 50, as designated by numeral 50b. The outer ring 50b may be locked by frictional engagement against the inner ring 50a by means of radially extending flanges 128 and 130 on the clamp 124 which are secured by bolt means 132, although other means for securing the blades may be utilized within the scope of the invention. The grooves 126 are displaced angularly relative to the grooves 120 by an amount such that preferably the blades in the outer ring 50b overlap the blades in the inner ring 50a by an equal amount for adjacent blades. The inner surfaces of the grooves 122 are thus arranged in a circle whose radius corresponds to the radius of the elongated, cylindrical upper portion of the cam 100, and the inner surfaces of the grooves 126 are similarly arranged in a circle having a radius which corresponds substantially to the minimum radius of the cam 102.

Figure 10:
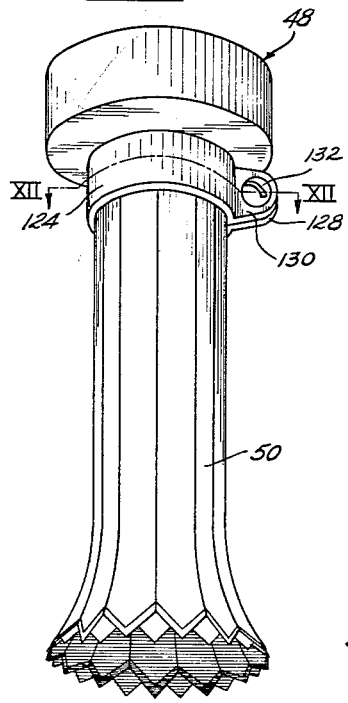
FIGURE 10 is a perspective view of the cutter blade assembly of the invention.
Figure 11:
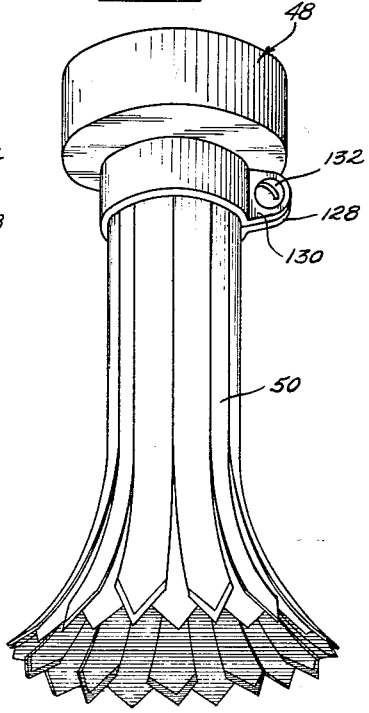
FIGURE 11 is a view corresponding to the view of FIGURE 10 and showing the blades in operative condition.

In order to maintain the blades in an initial inoperative position such as shown in FIGURE 10, and to return the blades after successive cutting operations, a helical spring 134 bears against the extension 120 at its upper end, and against the shoulder 136 of the cam 100 at its lower end. The blades 50 desirably are of spring steel or the like and have longitudinal edges 138 and 140 which widen outwardly toward the lower ends 142 thereof to provide the arrow head configuration referred to; and they therefore cooperate with the slot 108 in forming a stop means to hold the blade ends in the initial position and substantially at the level of the bottom of the slot. The ends 142 are chamfered as shown, and the blades of the respective inner and outer rings 50a and 50b are disposed in a back-to-back relationship which permits a smooth, continuous bevelled cut to be made when the ends are spread as shown in FIG. 11. Thus when the plunger 52 is moved downwardly, the prongs 56–62 engage the bearing 110 and cam the blades against cams 100 and 102 to the desired bevelling configuration. The spring 68 urges the housing 72 downwardly against the strip 38 in the cutting position (FIG. 2) and thus holds the strip as the spring 134 moves the blades to their retracted position (FIG. 1).

Figure 4:
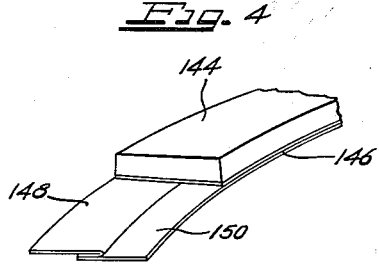
FIGURE 4 is a perspective view showing a preferred construction for the felt strip from which the pads are formed.
Figure 12:
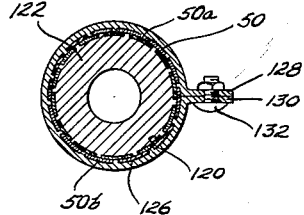
FIGURE 12 is a horizontal sectional view taken along the line 12—12 of FIGURE 10.

Referring now to FIG. 4, it will be seen that the strip 38 may consist of an upper thickness of felt 144 having an adhesive bottom coating 146 and cut in long strips of a desired width, folded plastic coated paper or vellum backing 148 and 150 of a corresponding width being adhesively applied to the bottom of the strip, in accordance with the understanding of those skilled in the art. Preferably the cuts 54 extend for slightly more than half the thickness of the felt 144.

As seen in FIGS. 1 and 2, the punch station 26 includes an upper cylindrical punch 152 and a lower punch rod 154 for simultaneously cutting the outer surfaces 16 of the pads 12 and the inner holes 18 formed centrally thereof. The upper punch 152 may be formed integrally with a shaft 156 and defines a central bore 158 which is dimensioned to telescopically receive the punch rod 154 in close-fitting relationship therein. The bore or passage 158 may be connected to vacuum evacuation means or otherwise connected to remove the discs 160 formed during the punching operation as hereinafter set forth.

The upper punch 152 is adapted to be intermittently moved downwardly into a cutting sleeve 162 synchronously with the positioning of a bevelled cut 54 therebeneath. The sleeve 162 may be secured to the platform 30 by bolts 164 and 166 extending through flanges 168 and 170 and the punch rod 154 is coaxially and threadedly secured in a bottom wall 172 thereof, so that its height may be adjusted by a kerf 174. Desirably, the upper end of the punch rod 154 terminates evenly with the platform 30. A bearing 176 is slidably received on the punch rod 154 within the sleeve 162, having a flange 178 biased into abutting engagement with a shoulder 180 of the member 162 by a spring 182 surrounding the post 172 and bearing against the bottom of the bearing 176 at its upper end and against the bottom wall of the member 162 at its lower end.

Thus the downward movement of the punch 152 simultaneously moves a bevelled portion of the strip 38 into the sleeve 162 and shears the strip to form the edge 16 of the pad intersecting edge 14, and causes the punch rod 154 to punch the hole 18 in the pad and to move the disc 160 upwardly in the bore 158. As the punch 152 moves downwardly into the sleeve 162 and telescopically receives the punch rod 154, to accomplish the internal and external shearing described, the bearing 176 is also moved downwardly as shown in FIG. 2. Upon upward movement of the plunger, the bearing raises the completed pad to the level of the support platform 30, and within the hole formed by the punching operation in the strip 38, the upward movement of the bearing being limited by the flange 178 and shoulder 180. In order to hold the strip 38 in position during upward movement of the plunger 156, a holding flange 183 may be provided which is formed integrally with a sleeve 184 slidably receiving the plunger. The sleeve 184 may be provided with an axial slot 186 to receive a guide bolt 188 so as to maintain the sleeve against relative rotation, and the plunger 152 may carry an annular shoulder 190 against which a spring 192 bears, the lower end of the spring bearing against an upper shoulder 194 on the sleeve 184 so as to maintain the flange 183 in position on the strip 38.

In order to remove the waste rings 196 formed by the bevelling and cutting operations from the upper portions of the pads 12, vacuum station 28 is provided with upper and lower vacuum nozzles 198 and 200 disposed in register so as to enclose preferably a plurality of pads 12. In the example shown, three of the pads are received within the station 28. The lower vacuum nozzle is provided with parallel, axial openings 199 and 201 spaced to be in register with the bottom surfaces 22 of the pads, and outwardly extending grooves 203, 205 cooperate therewith so as to moderate the force of the vacuum. The upper vacuum nozzle 198 is formed as a hood having its lower edge portions in contact with the strip 38, and the effective pull of the lower nozzle on the pads 12 exceeds that of the upper nozzle so as to hold the pads on the platform 30 while permitting the strip to progress uninterruptedly. However, the pull of the upper nozzle 198 is sufficient to draw the waste rings 196 into the conduit 207 for removal to a suitable location (not shown). The pads 12 will thus move from the vacuum station 28 in finished form, positioned within the individual openings 202 formed by the cutting operation effected by the punch station 26.

The strip 38 is then passed around the arcuate terminal portion 44 of the support means 30 and into engagement with the ejector wheel 46, over which it is drawn by the rollers 40 and 42, which are rotated in clockwise and counterclockwise direction respectively by suitable gear means (not shown). The ejector wheel 46 is fixedly mounted on a shaft 206, and may be rotated by the meshing engagement with the strip 38 of bosses 204 in the holes 202, or by suitable gear means (not shown), to assist in moving the strip. The angular spacing of the bosses 204 from each other is such as to bring them into successive registration with the holes 202 as the strip is passed thereacross, and the bosses are thus dimensioned and configured to project into the holes so as to engage the finished pads 12 and eject them outwardly from the strip. For this purpose, the wheel 46 is desirably disposed beneath the end portion 44 in substantially a tangential relationship thereto, and the rollers 40 and 42 are set inwardly and below the wheel 46 to draw the strip thereover in fully meshing relation.

As seen in FIGURES 13 and 14, a bearing member 110a may be provided having an oval-shaped extension 120a for producing an ovoid bevel cut, it being understood that the bearing or casing therefor (not shown) is desirably formed with a corresponding cross-sectional configuration; and the cam head 100a for the cutter is similarly of an oval shape so as to cam the blades 50 into a fan-like oval form as the cutter in intermittently depressed. It is preferred that the guide post 98a or the guide bearing 110a have guide tongues formed therein, as indicated at 210 and 212 for the guide bearing 110a, which engage in complementary slots in the post 98a in the example shown, so as to prevent angular rotation of the bearing assembly and blades; and a similar guide means may of course be provided for the post 98 shown in FIG. 5.

There has thus been provided a mechanism for bevelling, punching and ejecting felt corn, callous or similar pads in a continuous process requiring no manual operations and which is extremely reliable and efficient. The beveling station 24 cooperates with the punching station 26 so that after the individual pads have been beveled as described, the punching operation will provide a lower vertical edge which intersects the beveled edge and will simultaneously and by the same means form a center hole in accordance with the desired construction for the pad. Coacting vacuum station means will then remove the cross-sectionally triangular waste ring produced by the bevelling and punching operations and will also maintain the pads in proper position in the strip from which they are cut so that they are moved along the upport platform without interruption. The holes formed by the punching operation and the removal of the said cross-sectionally triangular waste rings thereupon will receive projecting bosses of a gear-like ejector wheel successively therethrough so that the ejector will positively eject the completed pads from the strip. The overlapping blades of the cutter spread outwardly in a continuous cutting edge as each beveling operation is performed so that there are no gaps or unevenness in the bevelled surfaces formed thereby, and the pads may be formed in either a circular or oval or other regular shape as desired. Thus the entire mechanism is extremely simple in construction and will resist break-down even over extended periods of operation.

Although I have herein set forth and described my invention with respect to certain specific principles and details thereof, it will be understood by those skilled in the art that these may be varied without departing from the spirit and scope of the invention as set forth in the hereunto appended claims.

I claim as my invention:

1. In a machine for forming bevelled corn, callous or similar pads continuously and automatically, a bevel cutter for making closed, bevelled cuts in material for forming felt corn, callous or similar pads comprising a plurality of elongated, flexible blades having sharpened bottom ends, means at the upper ends of said blades retaining said blades in inner and outer rings with the blades in the respective rings arranged in staggered, abutting, depending relationship, the upper ends of said blades being disposed cylindrically, means for moving the blades downwardly and cam means flexing and camming the lower ends of the blades outwardly in splayed relation to form a continuous bevel cutting edge when said blades are moved downwardly.

2. In a machine for forming bevelled corn, callous or similar pads continuously and automatically, a bevel cutter for use in forming bevelled upper edges on a felt corn, callous or similar pad comprising a plunger, a plurality of prongs carried by said plunger, a housing having a guide defining holes slidably receiving said prongs therethrough, a guide post slidably extending through said guide and into said plunger, said guide post carrying a cam head at its lower end, spring means connecting said housing and said plunger and a blade assembly including a bearing slidably mounted on said guide post and within said housing, spring means urging said bearing toward said guide in said housing and a plurality of spring metal blades having sharpened end portions mounted in overlapping, staggered relationship around said bearing and extending through said guide slot, the ends of the blades above the guide slot being cylindrically aligned, whereby upon depression of said plunger to move the housing into contact with a piece of material to be cut, the blades will spread outwardly to form a continuous cutting edge having an angle of inclination determined by said cam head.

3. In a machine for forming bevelled corn, callous or similar pads continuously and automatically, a bevel cutter comprising a plunger, a housing, a guide post secured in said housing, said plunger slidably receiving the upper end of said guide post, a bearing slidably mounted on said guide post within said housing, a plurality of flexible blades secured in depending, overlapping relationship on said bearing and having cutting edges at their lower ends, a cam head at the lower end of said guide post having an outwardly flaring surface engaging said blades, means biasing said housing away from said plunger, means biasing said bearing toward said plunger and means carried by said plunger moving said bearing downwardly when said plunger is moved downwardly where to cam said blades downwardly and outwardly, said blades being bent outwardly by said cam to form a continuous bevel cutting edge in their downward position.

4. A method of making bevelled felt pads for corns, callouses and the like comprising the steps of camming a plurality of overlapping blades into engagement with a strip of felt or the like to form spaced closed bevel cuts, punching peripheral side edges in intersecting relation with said bevel cuts, simultaneously punching a hole in the center of the pads defined by said peripheral edges, applying vacuum to the pads to maintain them in alignment with the strip while removing the waste rings above said bevelled cuts formed by the bevelling and punching operations and rotating a wheel having projection bosses into meshing engagement with the pads to successively eject the pads.

5. In a machine for forming articles such as surgical pads or the like, a bevel cutter comprising a plurality of elongated, flexible blades having sharpened bottom ends, means at the upper ends of said blades retaining said blades in inner and outer abutting rows with each of the said rows being of a correspondingly continuously closed arcuate configuration, the blades of the respective rows being staggered with respect to one another, means for moving the blades downwardly, and cam means including a closed arcuate cam portion complementary to the rows for flexing and camming the lower ends of the blades outwardly to form a continuous bevel cutting edge during downward movement of the blades.

6. In a machine for forming bevelled corn, callous or similar pads continuously and automatically, the combination of feeding means for intermittently advancing a strip of corn pad material, bevelling means spaced above and in the line of travel of the material for forming a closed ring-like bevelled cut in the upper portion of the strip of material during a dwell in the travel thereof, a punch spaced in advance of said bevelling means in the line of travel of the strip material for cutting simultaneously a peripheral vertical edge through the thickness of the strip of corn pad material and intersecting a previously bevelled cut and a central hole within the edge of the bevelled cut after formation of the bevelled cut, and means for driving said bevelling means and said punch means an intermittently operating said feeding means to advance the strip material in stages for bevelling and punching, and for operating said bevelling means and punch during dwells in the advance of the strip material.

7. A machine for forming bevelled corn, callous or similar pads continuously or automatically comprising a support platform for supporting a moving strip of material, feeding means adjacent the advance end of said platform for drawing the strip material along said platform, means for intermittently driving said feeding means, a bevelling station above said platform having a plurality of elongated flexible blades having sharpened bottom ends, means retaining said blades in staggered, abutting, depending relationship in a cross-sectionally closed configuration, means operated during a dwell in the travel of the strip material for intermittently moving the blades downwardly, and cam means camming the lower ends of the blades outwardly to form a continuous beveled cutting edge, when the blades are moved downwardly, said bevelling station forming a succession of bevelled cuts in the strip material for a portion of the depth of the material during dwells in movement of the material, a punching station above said platform and in advance of said bevelling station including means for simultaneously cutting a vertical peripheral edge and a center hole through the thickness of said strip material during dwells in movement of the material so that the peripheral edge intersects the bevelled edge formed by said bevelling station, said punching station including means permitting the pad thus formed to move perpendicularly to the strip of material during said cutting operation and returning the pad to alignment with the strip of material after completing of the cutting operation, a vacuum station in advance of said punching station enclosing a portion of said platform along which the strip of material travels for removing waste rings formed by the intersection of said vertical peripheral edge and bevelled edge cuts, a rotatable ejector spaced in advance of said vacuum station, but rearwardly of said feeding means and intermittently driven upon the intermittent driving of said feeding means, said ejector having angularly spaced bosses projecting into the holes formed by said bevelling and punching operations and operable during advance of the strip material to eject the completed pads from the strip material.

8. In a machine for continuously and automatically forming a punched surgical pad having a bevelled configuration from intermittently moving felt strip material, means for first making a bevelled cut in the strip material for a portion of the thickness thereof, punching means cutting a peripheral vertical edge through the thickness of the material and punching a central hole in the strip material, the peripheral vertical edge intersecting the bevelled cut and forming a waste ring between the peripheral vertical edge and the bevelled cut, and means retaining the bevelled material to the intermittently traveling strip and removing the ring from the material comprising a lower vacuum nozzle engaging and sealed to the lower surface of the strip material and an upper vacuum nozzle facing said lower vacuum nozzle and in general alignment therewith and extending along the upper surface of the strip material, the vacuum in the upper vacuum nozzle being greater than that of the lower vacuum nozzle, to provide sufficient vacuum to remove the waste rings from the traveling strip, with an insufficient differential in vacuum between the upper and lower vacuum nozzles to remove the punched surgical pads from the strip.

References Cited in the file of this patent

UNITED STATES PATENTS

| | | |
|---|---|---|
| 348,763 | Millet | Sept. 7, 1886 |
| 524,726 | McHugh | Aug. 21, 1894 |
| 928,256 | Grissom | July 20, 1909 |
| 1,542,422 | Stubbs | June 16, 1925 |
| 1,692,387 | Schmitt | Nov. 20, 1928 |
| 1,786,153 | Doyle | Dec. 23, 1930 |
| 1,995,077 | Perryman | Mar. 19, 1935 |
| 2,320,092 | Miller | May 25, 1943 |
| 2,322,547 | Shalla | June 22, 1943 |
| 2,564,354 | Conner | Aug. 14, 1951 |
| 2,707,028 | Burton | Apr. 26, 1955 |
| 3,041,905 | Gabriel | July 3, 1962 |

FOREIGN PATENTS

| | | |
|---|---|---|
| 419,165 | Great Britain | Nov. 7, 1934 |